United States Patent [19]

Evans, III et al.

[11] Patent Number: 5,338,517

[45] Date of Patent: Aug. 16, 1994

[54] CATALYTIC DISTILLATION COLUMN REACTOR AND TRAY

[75] Inventors: William T. Evans, III, Houston, Tex.; Karl Stork, Munich, Fed. Rep. of Germany

[73] Assignee: Chemical Research & Licensing Company, Pasadena, Tex.

[21] Appl. No.: 884,378

[22] Filed: May 18, 1992

[51] Int. Cl.$^5$ .................................. B01J 8/18
[52] U.S. Cl. ........................... 422/191; 203/DIG. 6; 422/140; 422/142; 422/143; 422/145; 422/195; 422/216; 422/227; 422/228; 422/238; 422/311
[58] Field of Search .............. 422/140, 142, 143, 145, 422/187, 191, 193, 195, 216, 226, 227, 228, 238, 239, 311; 203/DIG. 6

[56] References Cited

U.S. PATENT DOCUMENTS

| | | | |
|---|---|---|---|
| 2,256,622 | 9/1941 | Murphree et al. | 422/191 |
| 3,003,640 | 10/1961 | Pearce | 422/191 |
| 4,089,752 | 5/1978 | Hancock | 203/99 |
| 4,471,154 | 9/1984 | Franklin | 203/DIG. 6 |
| 4,475,005 | 10/1984 | Paret | 568/697 |
| 4,847,430 | 7/1989 | Quang | 568/697 |
| 4,847,431 | 7/1989 | Nocca | 568/697 |
| 5,130,102 | 7/1992 | Jones, Jr. | 422/191 |
| 5,133,942 | 7/1992 | Jones | 422/142 |

Primary Examiner—Robert J. Warden
Assistant Examiner—L. M. Crawford
Attorney, Agent, or Firm—Kenneth H. Johnson

[57] ABSTRACT

A distillation column reactor is provided having special trays arranged within the column to provide better mixing and thus achieve better mass and energy transfer between the liquid, vapor and catalyst. The trays comprise a slotted support plate for the catalyst with openings to allow vapor passage through the catalyst from the tray below. A draft chimney or riser is provided directly above the slotted openings to increase the vapor velocity and carry the liquid and catalyst upward on the tray. A hood is included at the upper end of the chimney to direct the liquid-vapor-catalyst flow back down onto the tray. The liquid from the tray above is distributed onto the tray about the chimney by distributors which preferably extend below the static catalyst level on the tray.

11 Claims, 4 Drawing Sheets

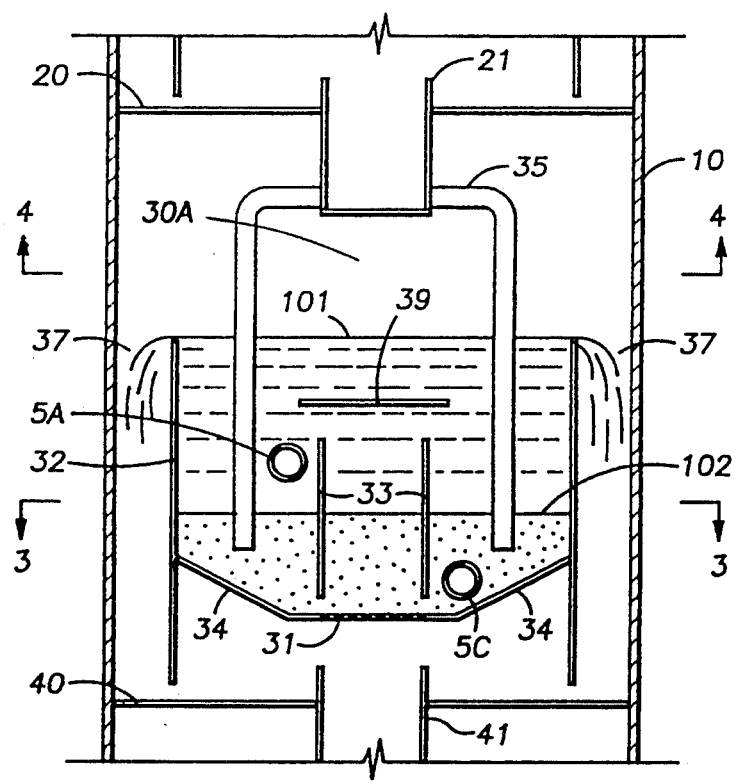
FIG. 2
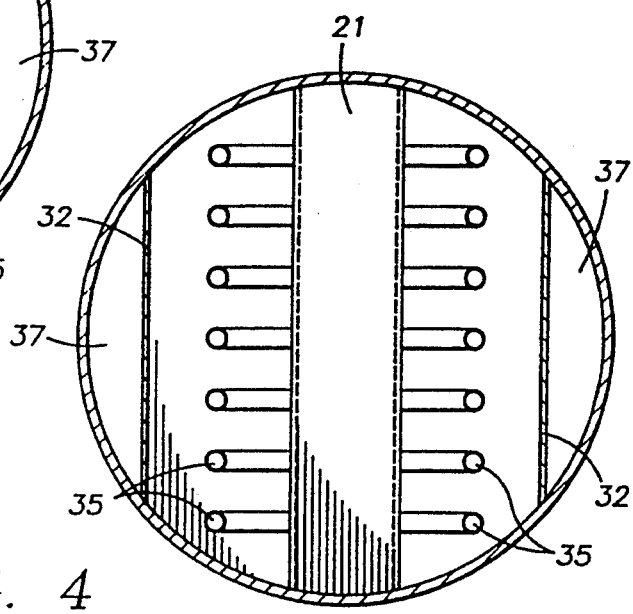
FIG. 3
FIG. 4

CATALYTIC DISTILLATION COLUMN REACTOR AND TRAY

BACKGROUND OF THE INVENTION

1. Field of the Invention

The present invention relates to a distillation column reactor used to concurrently carry out chemical reactions and separate the reactants from the reaction products by fractional distillation- More particularly the invention relates to special trays used within the distillation column reactor and their arrangement therein. Most particularly the invention relates to a tray which comprises a catalyst support plate having vapor openings and a draft chimney above the support plate to provide better contact and mixing.

2. Related Art

The advantages of combining the chemical unit operations of distillation and catalysis in one apparatus are well recognized. Catalytic distillation, as the combination is sometimes called, may be applicable foremost to certain chemical systems in which a desirable reaction that is limited by the chemical equilibrium proceeds in a temperature and pressure regime, in which livid and vapor phases co-exist, and in which the separation of the reaction products from the reactant(s) is required.

The advantages of catalytic distillation include the possible utilization of any heat of reaction in the distillation, the removal of the reaction products from the reaction zone immediately after formation, the return of the unreacted reactants by distillation to the catalyst zone and thus the opportunity to achieve most nearly complete conversion of the reactants.

Various concepts have been employed and proposed for the effective combination of catalysis and distillation in a single vessel. Most provide for the location of one or more fixed beds of catalyst in the reaction zone of the apparatus.

Where the catalyst is used as distillation packing, it is may be contained in cloth belt or wire mesh baskets. Additionally U.S. Pat. Nos. 4,443,559 and 4,215,011 disclose a particulate resin catalyst contained in pockets on a cloth belt. The cloth belt is arranged and supported in the column by wire mesh intimately associated with the cloth pockets. U.S. Pat. Nos. 4,439,350 and 4,536,373 disclose apparatus for placing the cloth belts containing the catalyst on conventional distillation column trays. In one commercially proven process, the catalyst is contained in pockets sewn into a fiber glass cloth which is then rolled into a bale, which serves as a distillation structure. Multiple bales are located on support trays inside a distillation tower.

This use of a catalytic distillation column reactor lends itself particularly well for reversible reactions in the liquid phase. See for example U.S. Pat. Nos. 4,336,407 (etherification), 4,482,775 (isomerization), 4,242,530 (separation of isobutene from $C_4$ streams) and 4,551,567 (deetherification). The combination is useful because the reactants, in the liquid phase are quickly separated from the reaction products due to boiling point differences by fractional distillation. Thus the reverse reaction is suppressed.

The performance of catalytic distillation systems utilizing heterogeneous catalysts is highly dependent on the arrangement of the catalyst beds in the distillation column. The processes taking place in the catalyst zone represent a highly complex physicochemical system. Reactions approaching the chemical equilibrium between the reactants and the reaction products will occur. There will also take place mass and heat transfer between the liquid and vapor phases leading to an approach to the physical phase equilibrium. The mass and heat transfer and thus the phase equilibrium will be influenced by the heat of reaction.

In many chemical reactions involving organic compounds the catalyst is deactivated over a period of time which may be as short as a few days or as long as a year or more. The cause may be the deposition of polymers on the catalyst surface, the neutralization of acid sites on ion exchange resins or some other mechanism. Invariably such catalyst deactivation requires either replacement or regeneration of the catalyst. More often than not, replacement or regeneration entails considerable expense and requires a shutdown of the entire system resulting in a loss of production.

Several different arrangements have been disclosed to carry out catalytic distillations. For example British Patents 2,096,603 and 2,096,604 disclose placing the catalyst on conventional trays within a distillation column. A series of U.S. patents, including those listed above discloses using the catalyst as part of the packing in a packed distillation column. More particularly U.S. Pat. Nos. 4,443,559 and 4,215,011 exemplify the latter.

Fluidization of the catalyst on the trays by the action of the vapor passing through the tray has also been suggested as in U.S. Pat. No. 4,471,154, wherein a fluidized height of the bed is determined, at least in part by the volume of the bed defined by the tray containing the catalyst and a screen, i.e., about 2 to 10 times the height of the settled catalyst bed.

Since most reactions occur in the liquid phase and vapor flow through the catalyst on trays may cause problems such as increased pressure drop and catalyst attrition, vapor by-passes around the catalyst containing trays have been proposed. See for example U.S. Pat. Nos. 4,847,430 and 4,847,431. Disclosed therein are alternating catalyst containing trays and standard distillation trays with the vapor from the distillation trays by-passing the catalyst containing trays and passing directly to the next higher distillation tray (U.S. Pat. No. 4,089,752 discloses the by-pass in a non-catalytic reaction distillation system).

SUMMARY OF THE INVENTION

The present invention provides a distillation column reactor having special trays arranged within the column to provide better mixing and thus achieve better mass and energy transfer between the liquid, vapor and catalyst. The trays comprise a slotted support plate for the catalyst with openings to allow vapor passage through the catalyst from the tray below. A draft chimney or riser is provided directly above the slotted openings to increase the vapor velocity and carry the liquid and catalyst upward on the tray. The chimney height above the plate is substantially lower than the liquid downcomer weir and thus the liquid level. Preferably a hood is included at the upper end of the chimney to direct the liquid-vapor-catalyst flow back down onto the tray. The liquid from the tray above is distributed onto the tray about the chimney by distributors which preferably extend below the static catalyst level on the tray.

Inlet and outlet nozzles may be provided to add or withdraw catalyst from the special trays if desired. In one embodiment, wherein the reaction products may react with other components, the liquid may be withdrawn from the special tray (and contact with the catalyst) and rerouted to standard distillation trays for separation of the liquid product and reactants.

The invention disclosed herein concerns a distillation column containing, along with a number of distillation trays or beds of distillation packing, one or more trays designed to achieve effective mass and energy transfer between liquid, vapor and catalyst.

One or more draft chimney trays, optionally separated by one or more conventional distillation trays and designed to hold circulating fluidized beds of catalyst, are located between sections of conventional distillation trays. In some catalytic distillation systems no distillation trays may be needed in either the top, or the bottom section of the column.

The feed stream or streams are introduced into the column on those trays which will provide the optimum number of circulating fluidized beds and distillation trays and require the least energy for the separation. The overhead and bottom products, reboil vapor and reflux are handled as in a conventional distillation tower.

Fresh catalyst may be added and used catalyst may be withdrawn in the form of a slurry whereby constant catalyst activity will be maintained. Catalyst may be added to the uppermost bed only, and then cascaded from bed to bed and withdrawn from the lowest bed. This method of addition and withdrawal will result in the most effective utilization of catalyst.

In some catalytic reaction systems the heat of reaction may be so great that the resultant vaporization leads to a large increase in vapor load on the trays above. In these instances it may be useful to condense some of the vapor generated in an external heat exchanger and to return the condensate to the chimney tray.

In some reaction systems the reaction products will, in the presence of the catalyst, react with other components in the system and form undesirable products which may have to be separated from the desirable products and further processed. In these systems it will be beneficial to withdraw part or all of the net liquids from some or all of the draft chimney trays and send them to the bottom fractionation section for separation of the reactants from the reaction products. The separated reactants are then returned to the draft chimney section.

BRIEF DESCRIPTION OF THE DRAWINGS

FIG. 2 is a more detailed plan view of one embodiment of the special tray of the invention.

FIG. 3 is a cross section of FIG. 2 taken alone line 3—3.

FIG. 4 is a cross section of FIG. 2 taken along line 4—4.

DESCRIPTION OF THE PREFERRED EMBODIMENT

For a detailed description of the preferred embodiments the reader is referred to the attached figures wherein like components are given like numbers for ease of reference.

Figure 1:
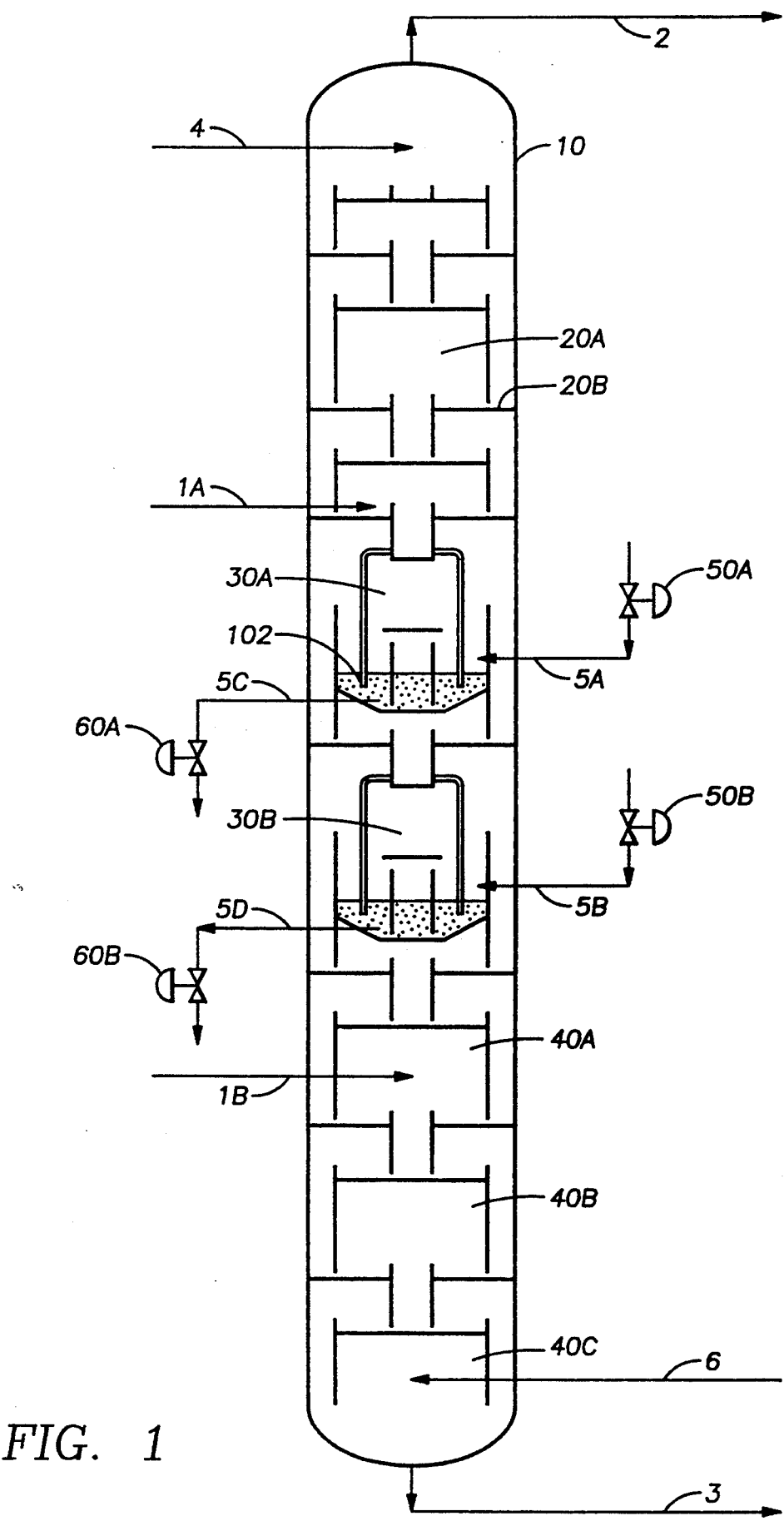
FIG. 1 is a simplified plan view in schematic form of a general distillation column reactor having the special trays of the present invention.
Figure 5:
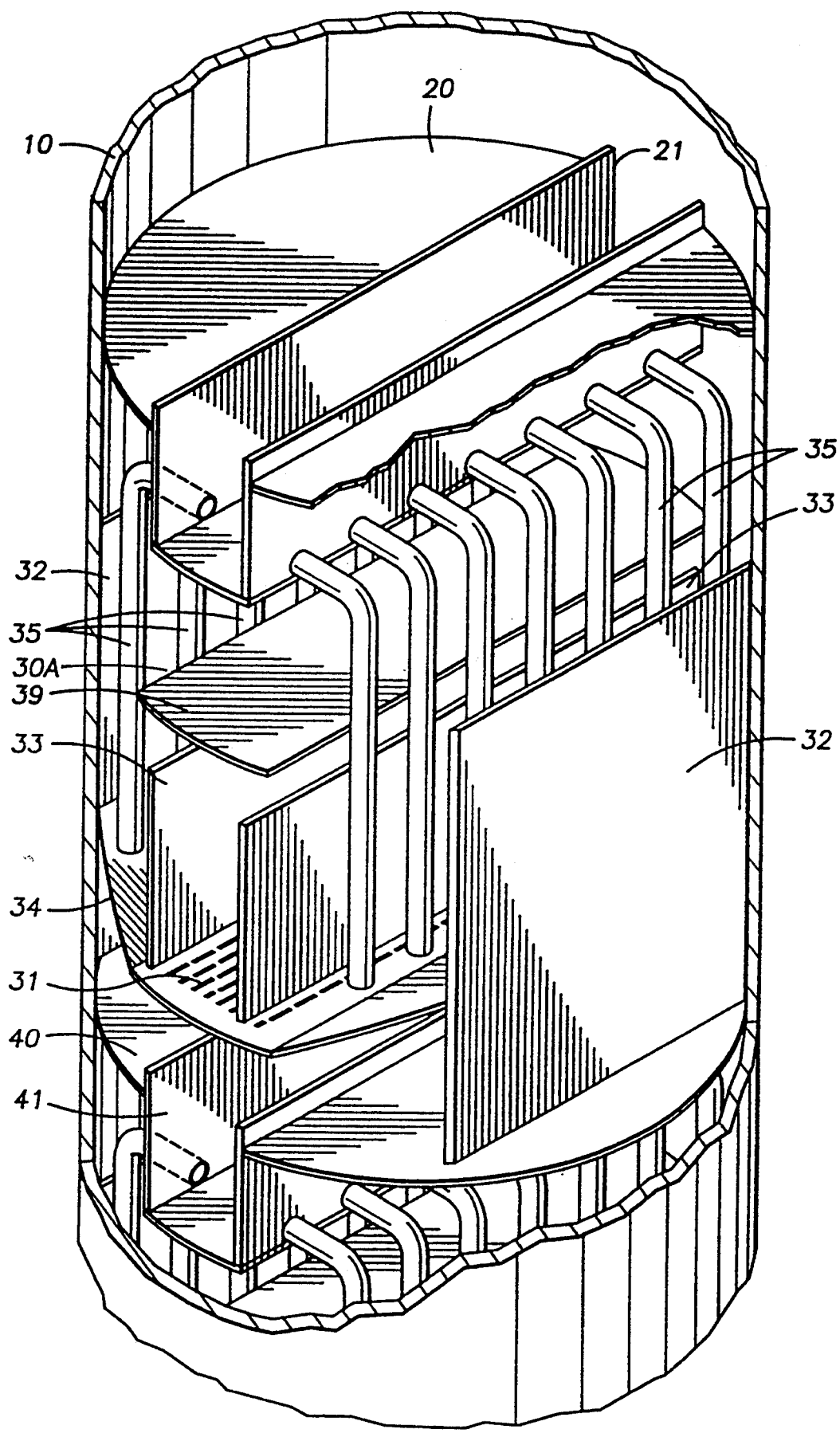
FIG. 5 is an isometric view in partial cross section of the section of the distillation column shown in FIGS. 2-4.

Referring first to FIG. 1 there is shown in schematic form a generalized version of the distillation column reactor 10 having the chimneyed trays 30A and 30B of the present invention. The distillation column reactor 10 is shown to have standard distillation trays 20A and 20B above the chimneyed trays 30A and 30B and standard distillation trays 40A, 40B, and 40C below the chimneyed trays 30A and 30B. In this schematic the feed is shown to enter the distillation column reactor 10 in separate lines 1A and 1B. In practice the feed stream or streams are introduced into the column on those trays which will yield the optimum number of circulating fluidized beds and distillations trays and requires the least energy for the separation. Overheads are taken via flow line 2 and bottoms via flow line 3. Reflux is returned via line 4 and reboiler liquid returned via line 6.

Each of the chimneyed trays contains particulate catalyst 102 suitable for carrying out the desired reaction. The catalyst may be added to the trays 30A or 30B as desired via flow lines 5A or 5B through control valves 50A or 50B, respectively. Similarly catalyst may be withdrawn via lines 5C or 5D through control valves 60A or 60B. This latter feature is especially useful where the catalyst becomes deactivated because it allows for replacement of the catalyst without shutting down the distillation column reactor.

Referring now to FIGS. 2-5 a more detailed description of one of the chimneyed trays 30A is shown. The catalyst 102 is supported on a slotted plate 31 having openings for vapor passage therethrough. On either side of the slotted plate 31 is a solid support plate 34 inclined upward and in sealing engagement with the downcomer wall 32. A draft chimney 33 is disposed directly above the slotted support plate 31 to increase the vapor velocity and cause the liquid and catalyst to rise through the chimney causing effective mixing of the vapor, liquid and catalyst. A hood 39 is disposed above the chimney 33 to deflect the liquid containing the catalyst back downward toward the solid support plates 34 between the chimney walls and the downcomer walls 32. Liquid from the distillation tray 30A is collected in header 41 and fed to successively lower trays in the lower distillation section 40.

Liquid from the distillation tray 20 above is collected in header 21 and distributed onto the chimneyed tray 30A via a plurality of distribution pipes 35 which terminate immediately adjacent the solid support plates 34 and below the static catalyst level. The downcomer walls 32 extend upward above the support plates 31 and 34 and hood 39 to provide a weir having a sufficient height to insure separation of the particulate catalyst from the liquid 101 before the liquid flows over the walls 32 and down the downcomer space 37 to the tray below. Alternatively the catalyst may be allowed to overflow, i.e., a cascade with the liquid to the next lower tray until it reaches the lowest chimneyed tray where it may be removed as with one of the withdrawal line 5C or 5D. In such a case catalyst would be continuously added to the topmost tray through an inlet line such as 5A.

In some catalytic reaction systems the heat of reaction may be so great that the resultant vaporization leads to a large increase of the vapor load on the trays above. In these instances it may be useful to condense some of the vapor generated in an external heat exchanger (not shown) and to return the condensate to the chimneyed tray. Additional heat balancing equipment as is common in distillation columns (pump arounds) may be included where needed in the column.

Figure 6:
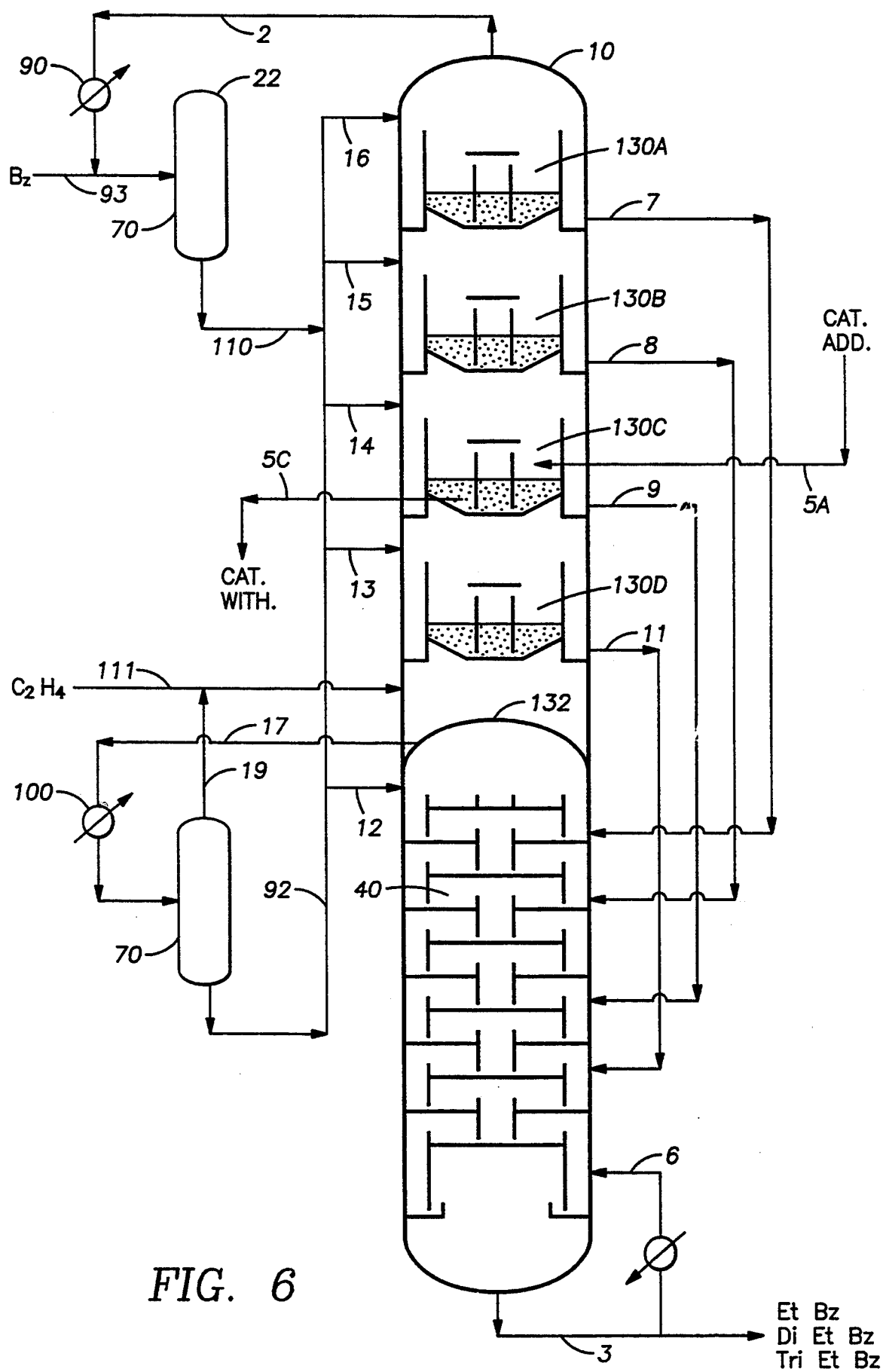
FIG. 6 is a plan view in schematic form of the use the present invention in the process for the alkylation of benzene with ethylene to make ethyl benzene.

In some reaction systems the reaction products will, in the presence of the catalyst, react with other components in the system and form undesirable products which may have to separated from the desirable product and further processed. In these systems it would be beneficial to withdraw part of all of the net liquids from some or all of the chimneyed trays and send them to the bottom fractionation section for separation of the reactants from the chimneyed tray section. The separated reactants would then be returned upward to the chimneyed tray section. In FIG. 6 such a system is shown in schematic form. The process shown is for the synthesis of ethylbenzene from the reaction of benzene and ethylene. In this system ethylbenzene continues to react with additional ethylene to form di- and tri-ethylbenzenes, and in small amounts, even heavier compounds.

As depicted in FIG. 6 the benzene is added to the reflux drum 22 as feed via line 93 and via line 110 to trays 130A–D, respectively. Ethylene is fed below the chimneyed trays 130A, 130B, 130C and 130D via line 111. Unreacted benzene and light components are removed via overhead 2. Lights may be vented at condenser 90 and unreacted benzene mixed with the benzene feed 93. For illustration purposes the catalyst addition and withdrawal lines are shown on tray 130C. The total net liquid from each of the chimneyed trays is withdrawn via lines 7, 8, 9 and 11 respectively and fed to successively lower trays in the lower distillation section 40. The vapor from the lower distillation section is collected by header 132 via line 17 and partially condensed in condenser 100. The lighter components are combined with the ethylene feed 111 via line 19. The condensed liquid is collected in separator 70 and thence fed back to the chimneyed trays via header 92 and flow lines 13, 14, 15 and 16, respectively and a portion returned as reflux to the lower distillation zone via line 12. Alkylated products are removed via line 3 and a portion returned via feboiler line 6.

In other embodiments the chimneyed trays may be separated by standard trays or distillation packing. The arrangement should be selected that best suits the reaction and distillation at hand.

The invention claimed is:

1. A draft chimney tray for use in a distillation column reactor, comprising:
   (a) a catalyst support plate having openings therethrough for vapor passage upward;
   (b) a draft chimney disposed directly above said openings in said catalyst support plate to increase the vapor velocity thereby fluidizing a solid particulate catalyst in a liquid on said catalyst support plate;
   (c) a hood disposed above said draft chimney to deflect the rising vapor, liquid and catalyst downward toward said catalyst support plate;
   (d) a weir secured to said catalyst support plate to maintain a liquid level;
   (e) liquid distribution means disposed above said catalyst support plate to distribute the liquid onto said catalyst support plate; and
   (f) a downcomer area adjacent said weir to conduct the liquid overflowing from said weir to a next tray below.

2. The draft chimney tray of claim 1 wherein said catalyst support plate comprises a flat section defining said openings and solid support areas on either side of said openings, said solid support areas being inclined upward and secured to said weir.

3. The draft chimney tray of claim 2 wherein the weir height is above the hood and is sufficient to allow separation of said catalyst in said liquid.

4. The draft chimney tray of claim 3 further comprising catalyst withdrawal and addition means.

5. A distillation column reactor for simultaneously carrying out chemical reactions and separating the reactants and products, comprising:
   (a) a vessel of suitable material and construction for the desired reaction and distillation conditions;
   (b) feed inlet means for introducing feed into said vessel;
   (c) vapor outlet means for removing vapors from said vessel;
   (d) liquid outlet means for removing liquid from said vessel;
   (e) standard distillation structures disposed within said vessel; and
   (f) at least one draft chimney tray disposed within said vessel to support a catalyst thereon, each of said draft chimney trays comprising
      i) a catalyst support plate having openings therethrough for vapor passage upward through said draft chimney tray;
      ii) a draft chimney disposed directly above said openings in said catalyst support plate to increase the vapor velocity thereby fluidizing the catalyst in the liquid on said draft chimney tray;
      iii) a hood disposed above said draft chimney to deflect the rising vapor, liquid and catalyst downward toward said support plate;
      iv) a weir secured to said support plate to maintain a liquid level on said draft chimney tray;
      v) liquid distribution means disposed above said support to distribute the liquid from above onto said draft chimney tray; and
      vi) a downcomer area adjacent said weir to conduct the liquid from said draft chimney tray to a next tray below.

6. The distillation column reactor of claim 5 wherein said catalyst support plate comprises a flat section defining said openings and solid support areas on either side of said openings, said solid support areas being inclined upward and secured to said weir.

7. The distillation column reactor of claim 5 wherein the weir height is above said hood and is sufficient to allow separation of said catalyst in said liquid.

8. The distillation column reactor of claim 5 comprising a plurality of draft chimney trays, wherein the topmost draft chimney tray further comprises catalyst addition means and the bottom most draft chimney tray further comprises catalyst withdrawal means, and wherein the weir heights are above said hoods of all but the bottom most tray are insufficient to allow separation of said catalyst in said liquid such that the catalyst cascades downward in said distillation column reactor and is removed from said bottom most draft chimney tray and make up catalyst is added to said topmost draft chimney tray.

9. The distillation column reactor of claim 5 comprising a plurality of said draft chimney trays disposed above a plurality of standard distillation trays within said vessel and further comprising separate conduit means connected to each of said draft chimney trays to carry the liquid from each of said draft chimney trays to one of each of said standard distillation trays.

10. The distillation column reactor of claim 9 further comprising a separate distillation section containing said plurality of standard distillation trays and said separate conduit means connects each draft chimney tray in descending order to one each of said standard distillations tray in descending order.

11. The distillation column reactor of claim 10 further comprising a vapor collection header in said separate distillation section, partial condensing means connected to said header, a separator connected to said partial condensing means to collect the condensed material, and further conduit means connected to said separator to carry said condensed material selectively to said draft chimney trays.

* * * * *